US007673027B2

(12) United States Patent
Janakiraman et al.

(10) Patent No.: US 7,673,027 B2
(45) Date of Patent: Mar. 2, 2010

(54) METHOD AND APPARATUS FOR DESIGNING MULTI-TIER SYSTEMS

(75) Inventors: Gopalakrishnan Janakiraman, Sunnyvale, CA (US); Jose Renato Santos, San Jose, CA (US); Yoshio Turner, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1686 days.

(21) Appl. No.: 10/850,784

(22) Filed: May 20, 2004

(65) Prior Publication Data

US 2005/0262462 A1    Nov. 24, 2005

(51) Int. Cl.
*G06F 15/173* (2006.01)
*G06F 15/16* (2006.01)

(52) U.S. Cl. .................... 709/223; 709/217; 709/229

(58) Field of Classification Search ......... 709/223–229, 709/217–219, 250; 717/102, 107, 120
See application file for complete search history.

(56) References Cited

U.S. PATENT DOCUMENTS

| | | | | |
|---|---|---|---|---|
| 5,889,520 A * | 3/1999 | Glaser | ........................ | 709/224 |
| 6,851,094 B1 * | 2/2005 | Robertson et al. | ........... | 709/217 |
| 6,892,234 B2 * | 5/2005 | Knight | ........................ | 709/223 |
| 6,944,133 B2 * | 9/2005 | Wisner et al. | ................ | 709/217 |
| 6,993,743 B2 * | 1/2006 | Crupi et al. | .................. | 717/102 |
| 7,246,344 B1 * | 7/2007 | Christensen et al. | ........ | 717/109 |
| 7,302,400 B2 * | 11/2007 | Greenstein | ..................... | 705/8 |
| 7,426,562 B1 * | 9/2008 | Pravin | ........................ | 709/223 |
| 2005/0044197 A1 * | 2/2005 | Lai | ............................ | 709/223 |

OTHER PUBLICATIONS

"Automatic Design of Dependable Data Storage Systems," Keeton and Wilkes, in 10th ACM-SIGOPS European Workshop, Sep. 2002.
"Automated Multi-Tier System Design for Service Availability," Janakiraman, et al., First Workshop on the Design of Self-Managing Systems (at DSN-2003 San Fransicso), Jun. 2003.
"Hippodrome: running circles around storage administration," Anderson et al., Conference on File and Storage Technologies (FAST'02), pp. 175-188, Jan. 28-30, 2002.

* cited by examiner

*Primary Examiner*—Bharat N Barot

(57) ABSTRACT

A system and method for selecting a preferred design for a multi-tiered architecture of components based on a set of established criteria is provided. The system and method receive a model describing different design constructions and a set of performance and availability requirements and produces a design or set of designs that best meet these requirements. The system and method include a model for representing the infrastructure design space for multi-tier systems and their properties appropriate for judging performance and availability properties of services as well as associated cost. The method and system further include a method for searching the design space in an efficient manner.

12 Claims, 9 Drawing Sheets

```
tier_name=Web-Tier
    tier-resource=ResourceA    cluster=True     singleload=100     nmax=25
    tier-resource=ResourceB    cluster=True     singleload=300     nmax=25 tier_name=Application-Tier
    tier-resource=ResourceC    cluster=True     singleload=200     nmax=25
    tier-resource=ResourceD    cluster=True     singleload=600     nmax=25 tier_name=Database-Tier
    tier-resource=ResourceE    cluster=False    singleload=500     nmax=25
    tier-resource=ResourceF    cluster=False    singleload=1500    nmax=25
```

*FIG. 2A*

```
resource=ResourceA    MachineB Linux    WebServerX
resource=ResourceB    MachineA Unix     WebServerX
```

*FIG. 2B*

```
component=MachineA cost_cold=1000 cost_active=1100
perm_mtbf=650days failover_used=true failover_duration=2minutes
    repair_mttr=15hours    repair_cost=580
    repair_mttr=6hours repair_cost=1500
trans_mtbf=75days failover_used=false
    repair_mttr=30seconds  repair_cost=0
```

FIG. 2C

METHOD AND APPARATUS FOR DESIGNING MULTI-TIER SYSTEMS

BACKGROUND OF THE INVENTION

1. Field of the Invention

The present invention relates generally to the art of designing multi-tier system architectures, and more particularly to producing a design or set of designs meeting a high level set of performance and availability requirements.

2. Description of the Related Art

Certain businesses or other organizations deploying Internet and Enterprise services utilize components performing within multiple tiers. In such an environment, service downtime and poor performance either among individual components or within tiers can reduce overall productivity, revenue, and client satisfaction. The challenge in such an environment is to operate at efficient or sufficiently optimal levels of availability, where availability is defined as the fraction of time the service delivers a specified acceptable level of performance. Acceptable levels of performance may vary depending on the organization's business mission.

Component failure within the infrastructure supporting a service can adversely impact service availability. A "service" is a process that may run on one or more computing hardware components, and perhaps a large number of such components, including servers, storage devices, network elements, and so forth. Many of the hardware components run various collections and layers of software components, such as operating systems, device drivers, middleware platforms, and high-level applications. Performance of these components may be characterized by quantifiable statistics, including but not limited to component failure rates. For an individual component, if the component has a low failure rate in isolation, in total the combined infrastructure having multiple components can experience a significant rate of component failures. This significant component failure rate can in turn lead to frequent or extended periods of unplanned service downtime or poor performance.

The challenge in such an environment is to assess service availability and performance as a function of the different design choices including the type of components to be used, the number of these components and associated hardware and software configurations, and to select the appropriate design choice that satisfies the performance and availability requirements of the service at a relatively minimum cost.

Previously available assessment tools have been unable to automatically find a solution from this multi-dimensional design space that provides an enhanced cost-benefit tradeoff assessment to the user.

Currently available tools to select a design typically only enable evaluation of a single design. Since previous tools only evaluate single designs, system design has entailed employing human experts to manually define alternative designs satisfying the specific availability requirements. A primary disadvantage of the current approach is the need to employ an expert to carry out the design. Such experts may be in scarce supply or be relatively expensive. In addition, assessment and design according to the expert process is largely manual and likely slow. Finally, the final results of the manual design process are not necessarily optimal since they are guided mostly by experience and intuition rather than based on a systematic algorithm for searching the large, multi-dimensional space of candidate designs.

Automating the design and configuration of systems to meet user's availability requirements exists in very few situations. One system, an Oracle database design, implements a function that automatically determines when to flush data and logs to persistent storage such that the recovery time after a failure is likely to meet a user-specified bound. Automated design of storage systems to meet user requirements for data dependability have been considered, encompassing both data availability and data loss. Such technologies for automating subsystems, such as databases and storage systems tend to be domain specific and generally cannot be applied to designing multi-tier systems.

Certain previous attempts to manage component and configuration availability have been limited to automated monitoring and automated response to failure events and other such triggers. For example, cluster failover products such as HP MC/Serviceguard, Sun Cluster, and Trucluster detect nodes that fail, automatically transition failed application components to surviving nodes, and reintegrate failed nodes to active service upon recovery from the failure condition. IBM Director detects resource exhaustion in its software components and automates the rejuvenation of these components at appropriate intervals. Various utility computing efforts underway will also automatically detect failed components and automatically replace them with equivalent components from a free pool. Most notably, none of these products or processes provide an overall assessment for particular architectures, but merely react upon failure of a process, component, or tier.

Based on the foregoing, it would be advantageous to offer a system and method for designing multi-tier systems

SUMMARY OF THE INVENTION

According to a first aspect of the present design, there is provided a system for selecting a preferred design architecture for a multi-tiered architecture based on a service specification, an infrastructure specification, and service requirements. The system comprises a design generator receiving the service specification and the infrastructure specification and establishing a candidate design based thereon, and an availability evaluation engine configured to receive the candidate design and provide an availability estimate for the received design to the design generator. The design generator iteratively evaluates designs in combination with the ability evaluation engine to establish the preferred design.

According to a second aspect of the present design, there is provided a method for representing multi-tier service attributes, to be used in judging performance and availability of at least one service and costs associated with the at least one service. The method comprises listing at least one tier, listing candidate resource types usable in each tier, listing a service tier performance characterization for each candidate resource type, and providing an indication as to whether the service is deployable in a clustered configuration.

According to a third aspect of the present design, there is provided a method for representing infrastructure design choices describing at least one construction of a design. The method comprises providing a resource specification, said resource specification comprising at least one component specification, wherein the component specification comprises component cost and component availability properties derived from properties of components comprising the resource.

According to a fourth aspect of the present design, there is provided a method for selecting a preferred design for a multi-tier architecture of components based on an established downtime requirement, the method comprising establishing a minimum cost design, evaluating downtime for the minimum cost design, and if the downtime for the minimum cost design satisfies the specified downtime requirement, establishing the minimum cost design as the preferred design. For each resource type alternative for each tier, the method comprises assessing whether a minimum cost design for each resource type has higher cost than the current preferred design, and whether a minimum downtime design for each resource type has higher downtime than the specified downtime requirement, and skipping evaluation of any further design for this resource type if either condition is true, determining a fewest number of spare components such that at least one candidate design with the fewest number of spare components meets the specified downtime requirement, evaluating cost of each candidate design having at least the fewest number of spare components previously determined and at most a specified maximum number of spares, identifying evaluated designs having cost lower than the current preferred design, iteratively estimating downtime of each evaluated design and when one such evaluated design satisfying the specified downtime requirement, replacing the current preferred design with the one such evaluated design, and setting the lowest cost design to be the preferred design.

According to a fifth aspect of the present design, there is provided a method for selecting a preferred design for a tier of an architecture of components based on a set of established criteria. The method comprises establishing a baseline design satisfying a first criterion of the set of established criteria, evaluating a plurality of designs satisfying the first criterion based on available spare components for the tier and anticipated performance of the components in the tier, selecting a lowest cost design from the plurality of designs, and establishing the lowest cost design as the preferred design.

According to a sixth aspect of the present design, there is provided a method for selecting a preferred design architecture for a multi-tiered architecture based on a set of established criteria. The method comprises evaluating a plurality of designs having components in a plurality of tiers based on a set of criteria, selecting a lowest cost design from the plurality of designs, and establishing the lowest cost design as the preferred design.

According to a seventh aspect of the present design, there is provided a method for selecting a preferred design architecture for a multi-tiered architecture based on multiple sets of established criteria. The method comprises evaluating a plurality of designs having components in a plurality of tiers based on a first set of established criteria, and selecting the preferred design as the design best satisfying the second set of criteria from the plurality of designs evaluated.

According to an eighth aspect of the present design, there is provided a system for continuously tuning a preferred design for a multi-tier architecture. The system comprises a monitoring engine that continuously updates infrastructure attributes and service characteristics based on observation of a deployed system associated with the preferred design, a design generator receiving the infrastructure attributes and service characteristics and establishing a candidate design based thereon, an availability evaluation engine configured to receive the candidate design and provide an availability estimate for the received design to the design generator, wherein the design generator iteratively evaluates designs in combination with the ability evaluation engine to establish the preferred design, and a deployment mechanism to dynamically change the design to the preferred design when the preferred design is measurably enhanced compared to the design.

According to a ninth aspect of the present design, there is provided a method for modeling components in a multi-tiered architecture. The method comprises specifying available architecture components in an explorable partitionable format, wherein the explorable format and components described therewith may be employed to describe at least one service. Further, the partitionable aspect of the format enables configuring the model in different configurations.

According to a tenth aspect of the present design, there is provided a model for use in representing an infrastructure design space for multi-tier systems. The model comprises a specification for a plurality of components in an explorable partitionable format, wherein the explorable format and components described therewith may be employed to describe at least one service. The partitionable aspect of the format enables configuring the model in different configurations.

According to an eleventh aspect of the present design, there is provided a method for selecting a preferred design for a plurality of tiers of an architecture of components based on a set of established criteria. The method comprises computing a preferred design for each tier in isolation, said computing establishing a current tier design, wherein said computing assumes other tiers have minimal failures and minimal downtime, reducing downtime requirement for all tiers to a value slightly lower than downtime for the current tier design, and recomputing a best next design for any remaining tiers.

These and other objects and advantages of all aspects of the present invention will become apparent to those skilled in the art after having read the following detailed disclosure of the preferred embodiments illustrated in the following drawings.

DESCRIPTION OF THE DRAWINGS

The present invention is illustrated by way of example, and not by way of limitation, in the figures of the accompanying drawings in which:

FIG. 2A illustrates a service specification including descriptions of the services and/or components available and related relevant information;

FIG. 2B is a sample two resource listing;

FIG. 2C is a sample specification of a hardware component type;

DETAILED DESCRIPTION OF THE INVENTION

Figure 1A:
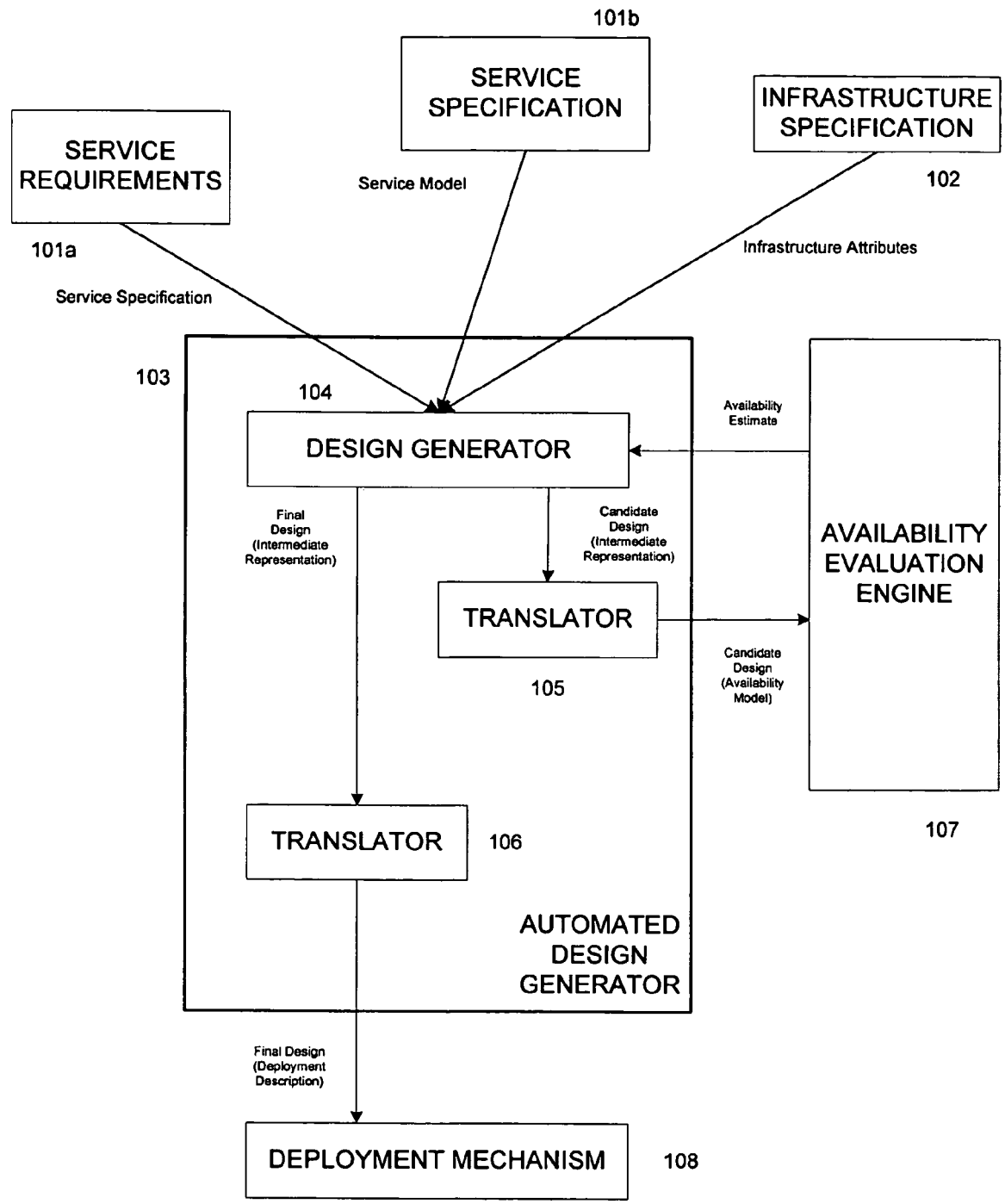
FIG. 1A shows an embodiment of the automated service design system.

The present solution automates the process of designing and determining an optimal or near-optimal configuration of a service's computing infrastructure to meet service availability and performance requirements, with respect to a given set of infrastructure and service attributes. The system targets the automated design of services having a common multi-tier structure, such as web tier plus application server tier plus database tier, but could also be used to design single tier services. The design space explored automatically can be large and consist of multiple dimensions including but not limited to a choice of hardware and software components, hardware and software configurations, number of hardware components, use of redundant components, state of redundant components (cold, standby, active), and so forth. Each choice within each of these dimensions presents a different tradeoff among availability, performance, and cost of ownership, that is assessed by the system. The system finds a solution from the multi-dimensional design space providing a best cost-benefit tradeoff with respect to the specific service. In general, this tradeoff can be modeled with a utility function of cost, performance, and availability. In a simple case, the problem can be reduced to finding a minimum cost solution that meets the user's availability and performance goals specified as simple thresholds.

The system receives, as input, a model describing the different ways in which a design can be constructed in addition to a set of high level requirements, namely performance requirements and availability requirements. The system then produces one design or set of designs that meet the set of high level requirements. The system includes two separate and distinct components. First, the system includes a model for representing the infrastructure design space for multi-tier systems and their properties that is appropriate for judging performance and availability properties of services and their associated costs. Second, the system includes a method for searching the design space in an efficient manner.

Terminology

As used herein, the term "customer" means the end user or recipient or beneficiary of the solution presented herein. In a typical scenario, a customer provides a service specification and a set of service requirements to the system. This information is combined with an infrastructure specification to generate a preferred architecture configuration satisfying the customer's requirements at a relatively minimum cost. The "infrastructure specification" is usually specified by the infrastructure provider, and may be stored in a repository to be used for multiple services and customers. Alternatively, the infrastructure specification could also be specified by the customer. For commonly used services, the service specification may be stored in a repository to be used by multiple customers. This infrastructure specification defines a list of components and mechanisms that can be used, as well as component and mechanism availability, performance and cost attributes. The "components" in the infrastructure specification can correspond to components available from a shared pool to be allocated to services on demand. Alternately, the components in the infrastructure list can correspond to components to be purchased after selecting the final configuration.

Figure 1B:
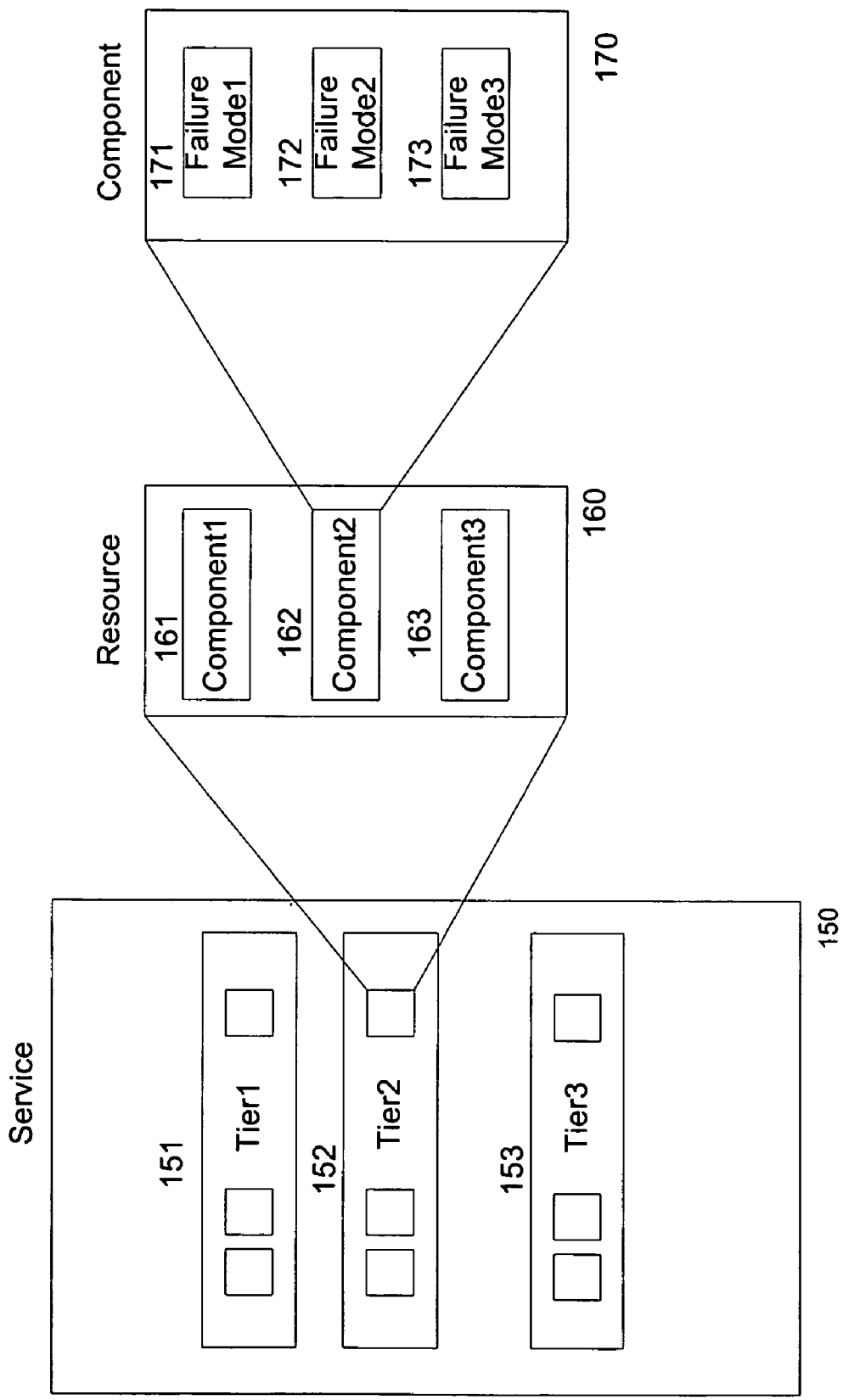
FIG. 1B illustrates a typical design space model.

Regarding the nomenclature for the models discussed herein, FIG. 1B illustrates a typical design space model. The design space may comprise a service 150 having a plurality of tiers 151, 152, and 153. Any number of tiers may be provided. Each tier comprises at least one resource, such as resource 160, having a plurality of components associated therewith, such as components 161, 162, and 163. Any number of components may be provided in a resource. Each component, such as component 170, has associated therewith at least one failure mode, such as failure modes 171, 172, and 173. Any number of failure modes for a component may exist.

Overall System Design

A preferred embodiment of the overall system 100 is presented in FIG. 1A. From FIG. 1A, the Service Requirements 101*a* is provided by the customer to the automated design generator 103 through a user interface (UI). The Service Specification 101*b* describes the service characteristics to the automated design generator 103. In one embodiment, Service Specification 101*b* for one or more services are stored in a repository, and can be selected by the customer when the service is pre-defined. In another embodiment, the Service Specification is provided by the customer through a user interface. The Infrastructure Specification 102 is stored in a repository and provides the description of the design choices that can be used to generate designs. These design choices include component types, repair mechanisms, their associated attributes, and the manner in which different types of components can be combined to create valid resources to be used by services. These three input mechanisms, Service Requirements 101*a*, Service Specification 101*b*, and Infrastructure Specification 102 establish a set of criteria from which the system establishes a preferred design. All information provided to the automated design generator 103, whether from the Service Requirements 101*a*, the Service Description 101*b*, or the Infrastructure Specification 102, conform to the model definition described in detail below. The automated design generator 103 comprises a design generator 104 that receives information from Service Requirements 101*a*, Service Specification 101*b*, Infrastructure Specification 102, and in certain instances the availability evaluation engine 107 and produces a candidate design or intermediate representation based on the information received. The design generator 104, described in more detail below, may operate iteratively in conjunction with the availability evaluation engine 107 wherein the design generator 104 produces a candidate design, provides the candidate design to translator 105, which in turn provides an availability model of the candidate design to the availability evaluation engine 107. The availability evaluation engine 107 provides an availability estimate to the design generator 104. Once the design generator 104 identifies the final design or preferred design, the final or preferred design is provided to translator 106 in the form of an intermediate representation, and the translator 106 sends a translated representation from automated design generator 103 to a deployment mechanism 108 in the form of a deployment description of the final design.

In general, the translators of FIG. 1A provide a translation of a design in one format into that receivable by and operable at the receiving component. For example, different existing evaluation engines such as Avanto, Mobius, Sarpe, and so forth, can be used as the availability evaluation engine 107. Such evaluation engines are generally known to those skilled in the art. Each of these evaluation engines employs a different level of abstraction for modeling system availability. The internal availability model of the design generator 104 is translated into the appropriate model of the evaluation engine.

As shown in FIG. 1A, the overall system and the automated design generator 103 initially receives a service requirement and performs functions and assesses the proposed architecture according to the service description. The service requirement specifies the high-level "performability" requirements, or requirements for service performance and availability that preferably are satisfied by the component/service/tier. Performability requirements can be specified in many different ways. In one embodiment, the specification of performability requirements includes (1) the minimum acceptable performance for the service in service-specific units such as transactions per second for the expected type of transaction, and (2) a maximum downtime allowed over a specified period, such as annual downtime allowed. The term annual downtime or simply downtime indicate the expected time a service will be unavailable in a year. A service is considered unavailable whenever the number of active resources is not sufficient to achieve the service performance requirement.

Model Representing the Infrastructure Design Space

In a preferred embodiment, the service description describes the service structure by listing the tiers that are to comprise the service implementation, the candidate resources that can be used in each tier, the performance characterization of the service for each candidate resource type, and an indication as to whether the service could be deployed in a clustered configuration.

In general, the model specified and employed in the current design includes information about components in a form that can be explored and considered by various types of computing devices. The model therefore comprises a means for representing the components in a readable and explorable format. The listing of components in the model, or the description of the components, can be used to describe other services, or a nesting of component attributes may be provided such that performance of one service is based on performance of an associated or linked component specified within the model. The model may be partitioned such that different configurations may be explored. While the model may include component descriptions of varying detail depending on circumstances, at an absolute minimum, the model includes specifications on cost associated with the component, failure rates for the component, repair times for the component, and performance of the component.

One embodiment of such a model configuration is presented in FIG. 2A. From FIG. 2A, the attribute-value pairs describe an example of a three-tier structure. The first tier name is Web-Tier, and Web-Tier includes two possible tier resources, ResourceA and ResourceB. In this example, the web tier can be implemented with either the resources of the Resource A type or with resources of the Resource B type. Each design generated may select one of these options for each tier. In this example, both Resource A and Resource B can be clustered, i.e. multiple instances of the same resource type can be used in parallel to support high loads. A cluster Boolean flag set to false indicates that only one instance of this resource type can be used in this tier. In this case, spare resources cannot be active, since only one active resource is allowed. In the example of FIG. 2A, active spares may not be employed for the database tier, which is limited to a single active node, but active spares may be used for other tiers. For each resource option, the service specification also includes a characterization of the resource performance under the service's workload. The system may employ various methods for describing the performance of cluster configurations, where one such method uses a simple linear saturating performance model for cluster configurations. The parameter singleload indicates the performance, in service-specific load units, of a single resource, and the performance of a cluster of resources of the same type scales linearly with the number of active resources until saturating at a cluster of size nmax active resources. As an example, a resource, such as a web server, may be operated in a cluster where singleload is 100 transactions per second. In this example, load unit is expressed in transactions per second, and each web server can generally support a maximum of approximately 100 transactions per second. The performance of a cluster of such web servers scales linearly with the number of active web servers until 25 web servers are employed. In a preferred embodiment, each tier is supported by a homogeneous resource type.

The infrastructure repository information input to the automated design generator 103 describes the availability properties and costs of the various resource options. Each resource consists of a collection of hardware and software components. Generally, any component failure causes the resource that contains the component to fail. The example of FIG. 2B defines two resource types, each having three component types, namely hardware, operating system (OS), and application. For each component type, the Infrastructure Specification 102 specifies the cost and availability properties. An example specification of a hardware component type is shown in FIG. 2C.

The infrastructure cost can be represented using alternative cost models. In a preferred embodiment as illustrated in FIG. 2C, the concept of "cost" means the periodic cost, typically in units of currency, such as dollars, per unit of time. The cost for a component includes the component acquisition cost and component operational cost. Component operational cost can vary as a function of the operational mode of the component, such as on (active) or off (inactive). In the example of FIG. 2C, the cost may be 1000 dollars per period, such as per year, for an inactive hardware component used as a cold spare, as opposed to 1100 dollars per year for a component used as an active spare. Such a cost difference may represent the electrical power costs incurred when the hardware is powered on. Another example of mode dependent cost may be an application software component that may incur a cost only when it holds a floating license to operate as desired. The annual cost of a component is the sum of the periodic cost of operation in the selected operating mode combined with actual component cost. Actual component cost is the initial capital cost of the component annualized by dividing by the component's useful life in years, in the case in which the customer owns the resource. Alternatively, the actual component cost may be the rental cost of the component when the component is owned by an infrastructure provider. The annual cost of a resource is typically the sum of the cost of components in their corresponding operating modes.

Failure modes are associated with components, and each component can have multiple failure modes. From the example presented in FIG. 2C, a permanent failure mode with mean time between failures (MTBF) of 650 days and a transient failure mode with MTBF of 75 days is illustrated. For each failure mode presented, failover behavior of the component and repair options are specified as follows.

For each failure mode, the failover to an available cold spare resource is a valid design choice if the mode's failover_used flag is true, in which case failover requires time failover_duration to complete. In the example of FIG. 2C, failover to a cold spare resource is a valid design alternative for dealing with permanent failures (failover_used is true), and in that case failover to a spare resource would take two minutes (2 m). However, failover to a cold spare is not considered a design option for dealing with transient failures (failover_used equals false).

With respect to repair options, multiple repair options can be specified for each failure mode. The system may typically select one of these repair options for each component instance, and the selection applies to all resource instances in the same tier. Each repair option is described by the Mean Time To Repair (MTTR) enabled by the repair option and the annualized cost per resource or node of choosing the repair option. Failure detection latency may be included in the MTTR values.

In the example of FIG. 2C, permanent failure has two repair options. One costs $580.00 per node and completes repair with repair_mttr of 15 hours, and the other costs $1500.00 per node but completes repair in only 6 hours. These time periods and associated costs represent, for example, maintenance contracts that differ in cost and in the response time of the hardware repair staff. For transient failure, only one option is shown in this example, the option corresponding to resetting the hardware. As shown, 30 seconds are needed for the hardware to be reset. No cost is associated with this option in the example of FIG. 2C.

For each repair option, the specification can optionally specify a performance degradation parameter, not shown in the example of FIG. 2C. The performance degradation parameter indicates the degradation (as a percentage value) of the component's performance during fault-free operation as a result of having the repair option in the design (e.g., checkpoint overhead). For example, a value of 5 may indicate a five percent degradation of component performance as a result of having a repair option, such as checkpoint overhead computation, available within the design.

The number of components that may be used in constructing a design can be limited, particularly where existing hardware is intended to be used instead of purchasing and installing new hardware. An optional parameter, not shown in FIG. 2C, may be employed to indicate the maximum number of components of each type that can be selected for a design.

Searching the Design Space

The following describes operation of the automated design generator 103. The automated design generator 103 makes a series of design choices and incrementally builds an intermediate representation for the design. The representation so constructed has a hierarchical structure of tiers, resources, and components. The automated design generator 103 selects exactly one resource type for each tier and the number of active resources of that type to instantiate. Some of these active resources may be active spares, not needed to meet performance requirements unless some resource fails. In addition to choosing the active resources, the automated design generator 103 selects the number of cold spare resources for each tiers. The automated design generator 103 selects one repair option for each failure mode of each component of each resource. Selection of one repair option ensures that the selection is identical for peer resources in a tier. As the automated design generator 103 creates the hierarchical intermediate representation of a service design, the automated design generator 103 also calculates the cost for each design, equal to the sum of the cost of the components and the cost of the repair options selected for the components. The cost and availability of all the designs determine the optimal or near optimal design, generally defined as the design having the lowest possible cost and satisfying the performance and availability requirements of the service.

The design space search strategy for the automated design generator 103 may minimize the number of designs that need availability evaluation, as availability evaluation tends to be the most time consuming operation. The search strategy of the automated design generator 103 comprises two stages. In the first stage, the automated design generator 103 evaluates each tier independently to compute its optimal design. In the second stage the solutions for the tiers are combined into a global optimal design.

Figure 3A:
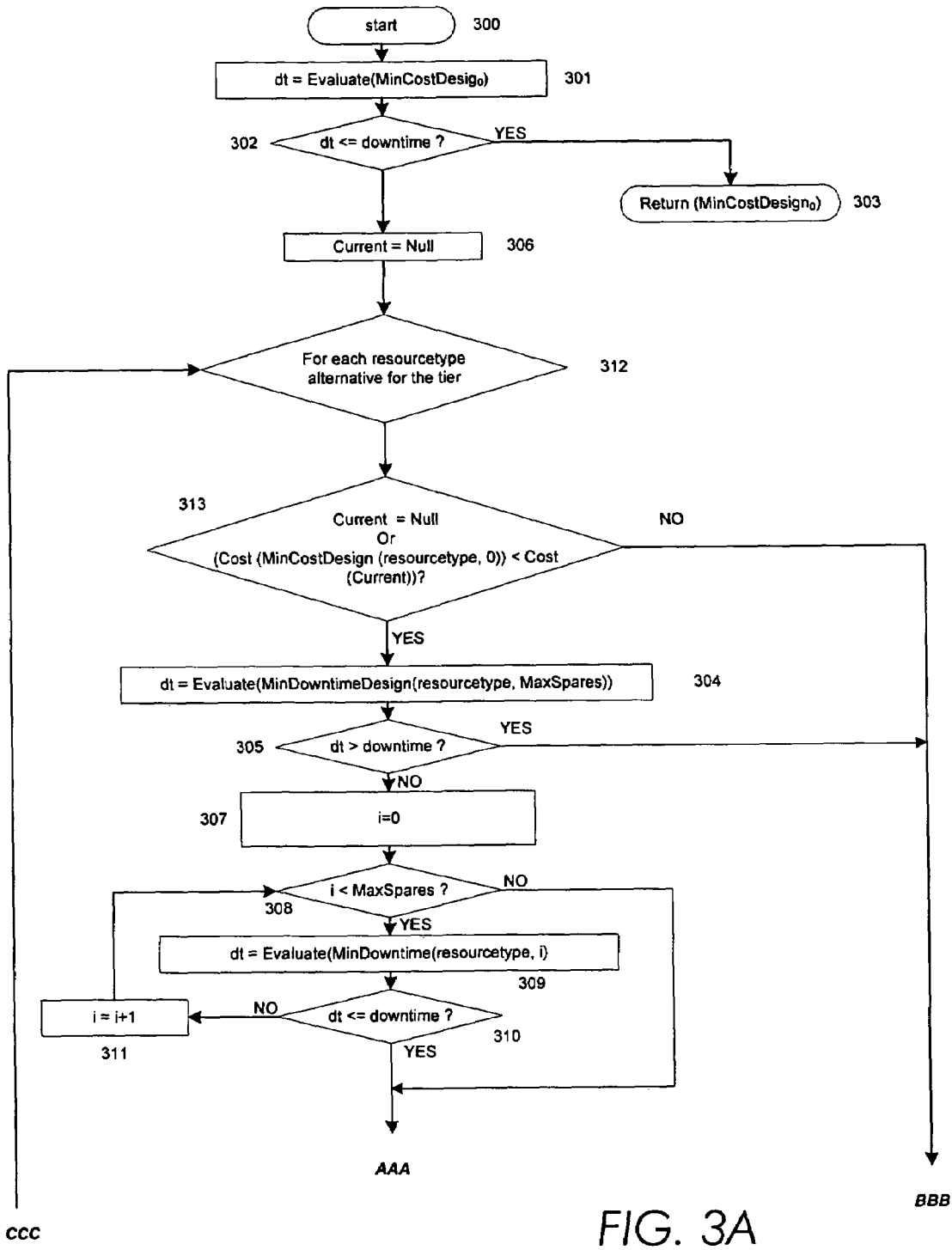
FIGS. 3A and 3B illustrate an embodiment of the algorithm used to select a preferred design based on the performance criteria provided.
Figure 3B:
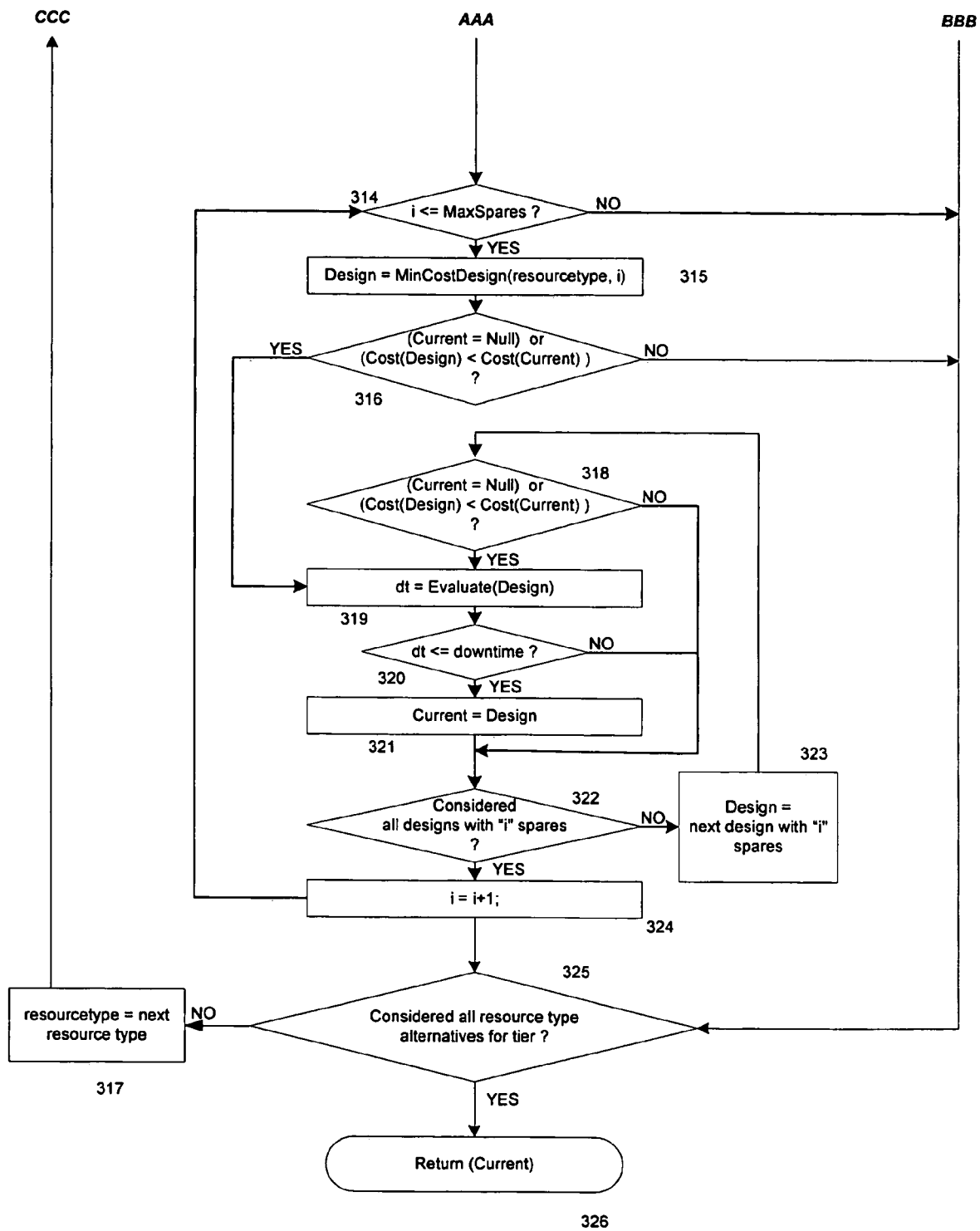

The algorithm illustrated in FIGS. 3A and 3B searches a single tier of components for an optimal or near optimal solution to addressing the configuration request presented, where the single tier uses a single type of resource. The optimal design for the tier uses an algorithm such as that shown in FIGS. 3A and 3B for all available resource types and selects the solution with lowest cost. From FIGS. 3A and 3B, the value dt is a variable representing the lowest found downtime for any design evaluated. Point 300 starts the procedure, and point 301 evaluates an initial $MinCostDesign_0$. In the present design, $MinCostDesign_i$ indicates a minimum cost solution available with i spare resources, where i spare resources indicate active or cold resources in addition to the minimum number of resources required to satisfy the service performance requirement (throughput). $MinCostDesign_0$ thus represents a minimum cost solution with no spare resources, but only with the minimum number of resources required to satisfy the required throughput. Point 302 evaluates whether dt from point 301 is less than or equal to downtime, a fixed value representing a minimum downtime (availability requirement) established by the user. If dt from point 302 is less than or equal to downtime, point 303 returns $MinCostDesign_0$ as the solution, as it is the lowest cost solution that satisfies the established criteria. If point 302 indicates that dt is not less than or equal to downtime, point 306 sets Current, representing the current preferred design satisfying the established criteria, equal to null, to indicate that no such design has yet been found. At point 312, for each resource type alternative for a tier, the system loops through the following procedure and exits at point 325 under the appropriate condition. Point 313 determines whether the cost for the minimum cost design for the specified resource type and the present tier is greater than the cost of the current preferred design. If so, the design is considered acceptable, and operation passes to point 325. If not, operation passes to point 304. dt is recomputed at point 304 based on a minimum downtime design using a maximum number of spares, MinDowntimeDesign(resourcetype,MaxSpares). MinDowntimeDesign(resourcetype,i) is a design using resourcetype with i spares where the resource state is set to the best option, active if possible, cold otherwise, and all repair options are set to the option having the minimum mean time to repair (MTTR). Searching is limited to a finite number of designs by defining a maximum number of spares, MaxSpares, as a constant value in the algorithm description. MinDowntimeDesign(resourcetype,MaxSpares) thus represents a lower limit for the downtime of all designs with at most MaxSpares spares, but possibly with a higher cost than the minimum possible. At point 305, if this calculated dt is greater than the required downtime, then no solution exists with at most MaxSpares spare resources that can satisfy the availability requirement, and the algorithm passes to point 325.

If a feasible solution exists, the system executes points 307 to 310 to find the minimum number of spares needed to satisfy the downtime requirement. The index i in these steps represents the current number of spares. The system initializes index i to zero at point 307. The system then performs a loop computing dt as the minimum downtime achievable with a design having i spares, seeking to find a minimum number of spares that will satisfy the requirements submitted. Point 308 evaluates whether i is less than the maximum number of spares. If i is less than the maximum number of spares, point 309 recomputes dt by evaluating the minimum downtime for the design for i spares, MinDowntimeDesign(resourcetype,i)$_s$. If i is not less than the maximum number of spares, then the minimum number of spares is equal to MaxSpares and the operation progresses to point 314, discussed below. Point 310 evaluates whether dt is less than or equal to downtime, and if not, increments i at point 311 and repeats points 308-310.

Point 314 evaluates whether i is less than or equal to MaxSpares. If not, the search stops, and the design returns the current configuration at point 317, as the number of spares cannot exceed the maximum. If i is less than or equal to the maximum number of spares from point 314, the system then sets the Design variable equal to MinCostDesign(resourcetype,i) at point 315, where MinCostDesign(resourcetype,i) is the minimum cost design among all designs using i spares. The variable Design at this point in the algorithm represents a current design being evaluated. Point 316 evaluates whether Current is equal to Null, i.e. the system has not yet identified another feasible design, where a feasible design is one that meets the availability requirement, or the cost of the design is less than the cost of the best, or lowest cost, feasible design identified to this point. If the condition on step 316 is true, the operation progresses to point 319, where the system evaluates the downtime of Design, and the result set to dt. Point 320 checks whether dt is less than or equal to downtime, and if so, Current is set equal to Design at point 321, i.e. Design is made the current preferred design. If dt is not less than or equal to downtime, operation progresses to point 322. Point 322 evaluates whether all designs have with i spares have been considered. If not, then point 323 sets Design equal to the next possible design with i spares, and operation loops back to point 318. If all designs with i spares have been considered, point 324 increments i and operation progresses back to point 314. At point 318, the cost of the design being considered (Design) is compared with the cost of the best feasible solution (Current) found so far, if one exists. If the system has already found a feasible design (Current is not equal to null) and the cost of the new Design is greater than or equal to the cost of Current, Design is discarded and the algorithm proceeds to point 322 to select the next design. If, at point 316, a feasible design was already found (Current is not equal to Null) and the cost of Design is greater than or equal to the cost of Current, no solution exists having i or more spares with a lower cost than the Current solution, and the algorithm progresses to point 325. Point 325 determines whether all resource types for the tier have been considered. If so, the Current design is the preferred design at point 326. If not, the next resource type is considered via point 317, and operation returns to point 312.

The foregoing algorithm, particularly the sections dealing with downtime, operates under the assumption that a multi-tier system is down when any one of the system tiers is down. Service downtime is approximated in this algorithm as the sum of the downtime of individual tiers. While two tiers can be down simultaneously, resulting in a total downtime slightly less than a sum-of-individual-tiers downtime, practical values of overlapping downtime are typically extremely low in a typical multi-tier computing architecture, thereby not increasing overall downtime. Thus any error incurred by approximating service downtime as a sum of downtime for individual tiers tends to be negligible, but may be factored into the solution if desired.

For a multi-tier solution, the design generator first computes the preferred design for each tier in isolation, assuming the other tiers have no failures and no downtime. The design generator then reduces the downtime requirement for all tiers to a value slightly lower than the value achieved for the current tier design, and recomputes the best "next" design for all tiers. The design generator continues this process until the sum of the individual tiers downtime does not exceed the service requirement. At this point, the design generator has a list of designs $lst_i$ for each tier i. Assuming the lists are ordered in decreasing order of downtime, the multi-tier design composed of the last design in each tier list $lst_i$ satisfies the service requirement but may not be the minimum cost one. To search for the minimum cost design, the system computes the global downtime of all possible combinations containing one design from each list $lst_i$ and selects the one design satisfying the downtime requirement with minimum cost. This selection does not require a design availability evaluation. If the current solution has at least one component which is the last design on a tier list $lst_i$, the system increments the size of that list, obtaining the "next" best design for that tier. The system then evaluates whether any new combination of tier designs lead to a lower cost solution. The algorithm stops when the minimum cost solution found thus far does not include any last design from each list $lst_i$.

Figure 4:
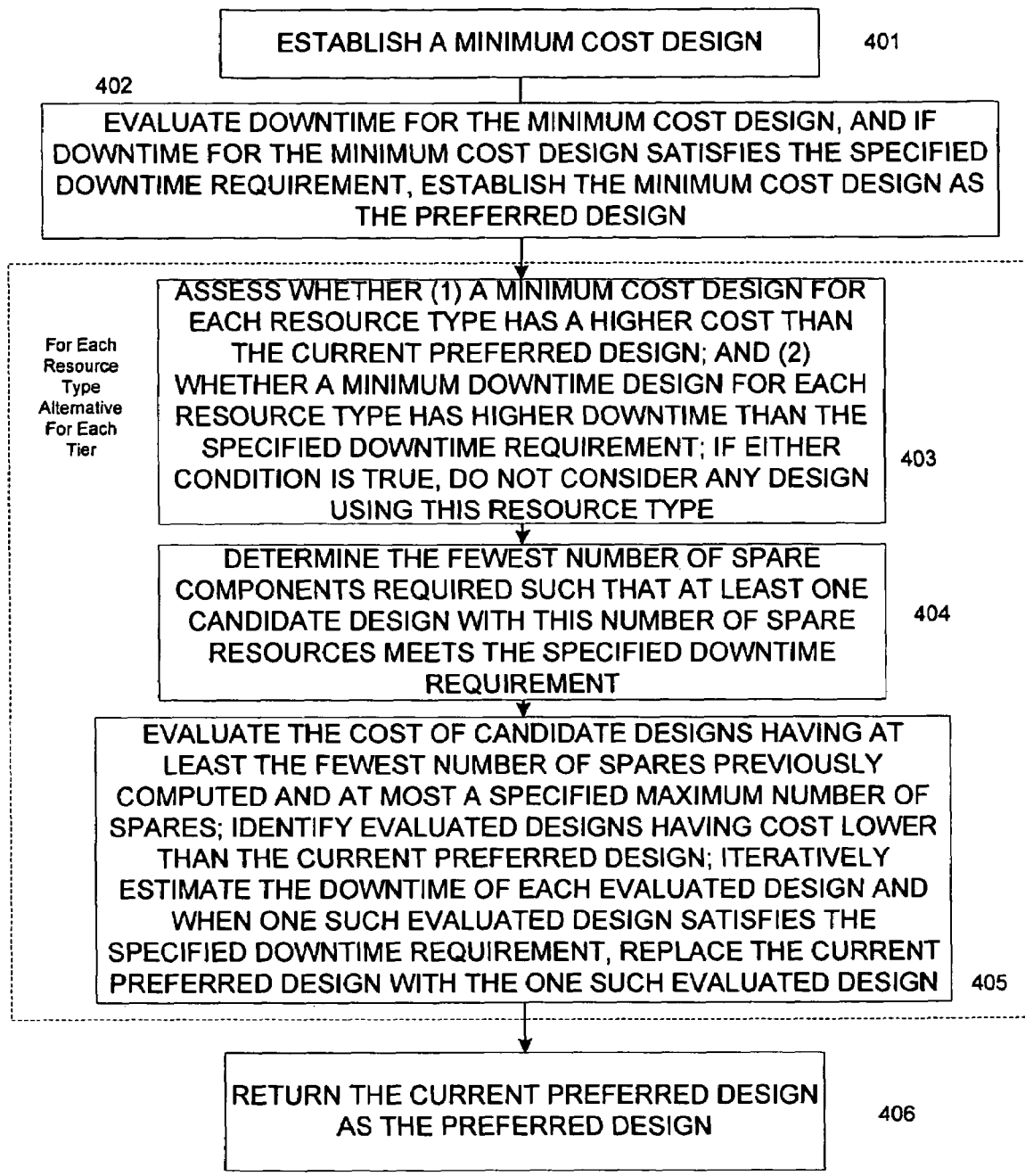
FIG. 4 illustrates a simplified version of the algorithm of FIGS. 3A and 3B.

A simplified version of the single tier evaluation embodiment is presented in FIG. 4. From FIG. 4, at point 401, the system establishes a minimum cost design. At point 402, the system evaluates downtime for the minimum cost design, and if the downtime for the minimum cost design satisfies the specified downtime requirement, the minimum cost design is the preferred design. For each resource type alternative for each tier, point 403 assesses whether a minimum cost design for each resource type has higher cost than the current preferred design, and whether a minimum downtime design for each resource type has higher downtime than the specified downtime requirement. If either condition is true, the system does not consider any design using this resource type. At point 404, the system determines a fewest number of spare components such that at least one candidate design with the fewest number of spare components meets the specified downtime requirement. At point 405, the system evaluates the cost of candidate designs having at least the fewest number of spares previously computed and at most a specified maximum number of spares. The system then identifies evaluated designs having cost lower than the current preferred design and iteratively estimates the downtime of each evaluated design. When one such evaluated design satisfies the specified downtime requirement, the system replaces the current preferred design with the one such evaluated design. At point 406, the system returns the current preferred design as the preferred design.

Operation

An example of operation of the system is presented for an application tier of an internet service. The system may, in the current example, explore the following design dimensions: resource type, number of extra hardware components, or spares, state of extra hardware components (active or cold), and selection of a maintenance contract. The present example assumes the infrastructure supports two types of hardware components, a dual processor machine, machine A, designated MA, having the ability to run UNIX, and an 8 way machine, machine B, designated MB, with an ability to operate Linux. This example further employs two different types of Application Servers software, ASA and ASB. Either Application Server can be installed on either hardware platform. Combining the two hardware options with the two software options offers four distinct resource options. In this example, an Application Server can be used in a cluster environment, and either application scales linearly up to 25 nodes for any of the resource configurations. Further, ASB represents a more mature product with a lower failure rate than ASA, where ASB has a higher cost. In addition, ASB in this example has a lower recovery time than ASA. Lower recovery time may result from various circumstances, including ASA providing a mechanism for checkpointing the application state on a network attached file system, a typically slow process. ASB may provide a mechanism for checkpointing the application state on remote peer memory, which is typically significantly faster. Additional or redundant machines added to improve availability could be used in two states, active and cold spare. In an active state, the machines are added to the tier cluster and are always operational, except under failure circumstances. Cold spare state exists where machines are nonoperational and are only brought online to replace a failed machine. Cold spares typically have lower cost than active resources because certain costs, including but not limited to operational and software license costs, may be avoided. Service downtime may be incurred during a failover transition from a nonoperational active unit to a cold spare. Repair options for the current example include four different maintenance contracts that can be purchased from a service provider. Each contract, bronze, silver, gold, and platinum, has a different cost and provides a different response time for on site technical support necessary to repair hardware failures.

Figure 5:
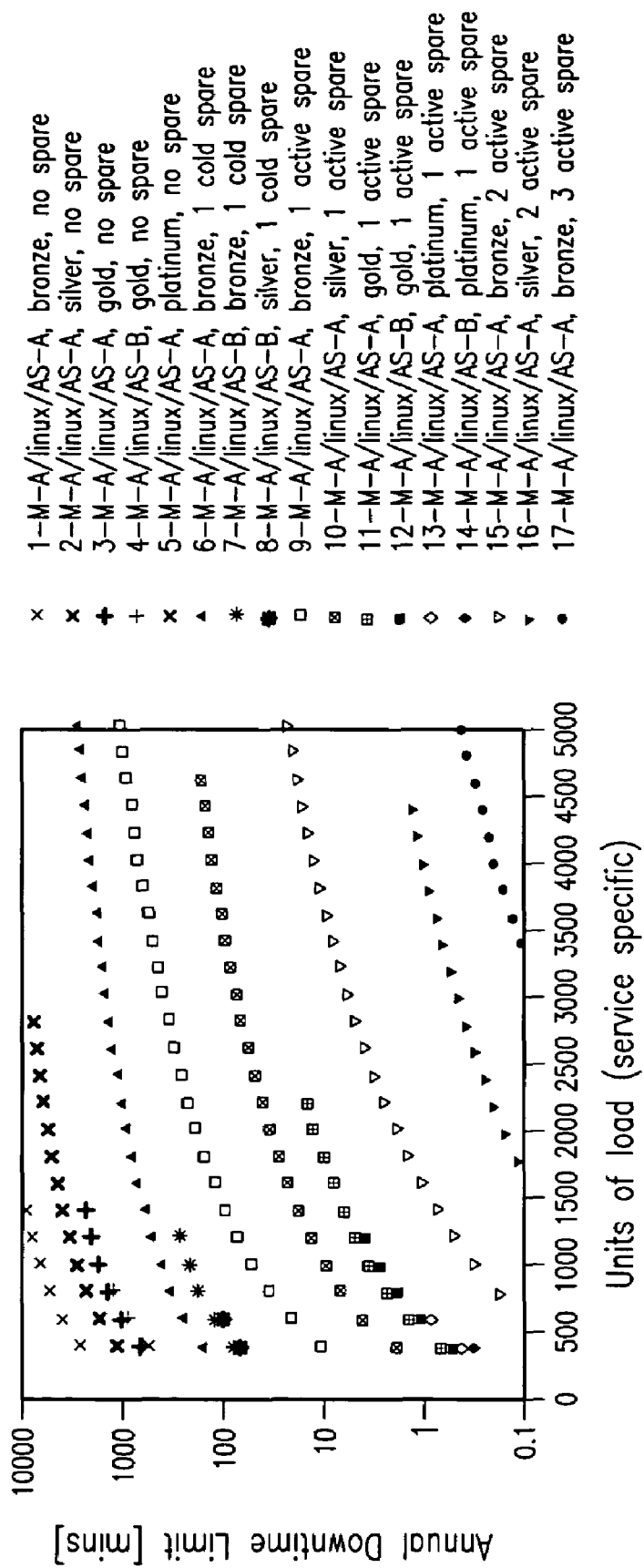
FIG. 5 shows an optimal solution graph for a range of potentially available single tier attributes corresponding to an example presented.

Sample input parameters related to component failure behavior and costs are presented in Table 1. Sample input parameters related to service characteristics are presented in Table 2. From Table 1, costs are in dollars per year, and for each component listed on the left side of the table, the information provided includes the cost to maintain the component in a cold state, cost to maintain the component in an active state (both combined to the annualized acquisition cost), types of failures of the component, such as transient failure, permanent failure, or crash, mean time between failures, available repair options for the type of failure encountered and the level of service contract selected, mean time to repair, repair cost, and failover time to transition to an active component. Table 2 lists the resource types, including the four machine-application server resources available, with available performance model, including the load capacity of each resource instance in service units of throughput and the maximum number of resources instances that can be employed in a cluster, as well as a cluster flag indicating that components can be clustered for each resource type (flag equal to true). Dollar costs, MTTFs and MTBFs are representative of typical components and situations found in the computing industry, while software failure rates are estimates.

selected by the algorithm in FIG. 3, for the corresponding performance and availability requirement specified in axis x and y respectively. Designs are represented in FIG. 5 by a grouping of resource, contract, and redundancy, where resource indicates the selected type of resource, contract indicates the type of service contract selected, and redundancy indicates the number of spares and the state of available spares. The load range, or performance requirement, shown on the x axis varies from 400 to 5000 units, where a unit represents a measurable unit of work per unit of time applicable to the particular service, such as transactions per second. 400 to 5000 units corresponds to a range of 2 to 25 nodes. The y axis represents the range of practical annual downtime values, from a fraction of a minute to 10,000 minutes, or approximately one week. In the two-dimensional space of requirements mapped by the performance requirement and availability requirement, each curve corresponds to a particular design that is cost optimal for all requirement points above the curve (and points on the curve) and beneath the immediately higher curve. For example, as shown in FIG. 5, curve 15 corresponding to MA/linux/ASA, bronze, 2 active spares, is cost optimal for all points above the curve and on the curve, up to curves 9, 10, 11, 12, 13, or 14, depending on units of load. For 2000 units of load, annual downtime for the curve 15 configuration is approximately 2, minutes, is cost optimal for all requirements greater than 2 minutes and beneath the

TABLE 1

Sample input parameters for component failure behavior and costs

| Component | Cost Cold | Cost Active | Failures | MTBF | Repair Option | MTIR | Repair Cost | Failover Time |
|---|---|---|---|---|---|---|---|---|
| | | | Transient | 75 days | Reset | 30 sec. | $0.00 | No |
| | | | Permanent | 650 days | Serv Contract | | | 2 min. |
| Machine A (MA) | $ 2,400.00 | $ 2,640.00 | | | 1. Bronze | 38 hours | $380.00/machine | |
| | | | | | 2. Silver | 15 hours | $580.00/machine | |
| | | | | | 3. Gold | 8 hours | $750.00/machine | |
| | | | | | 4. Platinum | 6 hours | $1500.00/machine | |
| | | | Transient | 150 days | Reset | 60 sec. | $0.00 | No |
| | | | Permanent | 1300 days | Serv Contract | | | 2 min. |
| Machine B (MB) | $85,000.00 | $93,500.00 | | | 1. Bronze | 38 hours | $10,000/machine | |
| | | | | | 2. Silver | 15 hours | $12,500/machine | |
| | | | | | 3. Gold | 8 hours | $16,000/machine | |
| | | | | | 4. Platinum | 6 hours | $25,000/machine | |
| Linux | $ 0.00 | $ 0.00 | Crash | 60 days | Reboot | 2 min. | $0.00 | No |
| UNIX | $ 0.00 | $ 200.00 | Crash | 365 days | Reboot | 4 min. | $0.00 | No |
| Applic. Server A (ASA) | $ 0.00 | $ 1,700.00 | Crash | 30 days | Restart | 2 min. | $0.00 | No |
| Applic. Server B (ASB) | $ 0.00 | $2.000.00 | Crash | 90 days | Restart | 30 sec. | $0.00 | No |

TABLE 2

Sample input parameters for service characteristics

| | Performance Model | | |
|---|---|---|---|
| Resource | singleload | Nmax | cluster flag |
| MA/linux/ASA | 200 load units | 25 nodes | True |
| MB/unix/ASA | 1600 load units | 25 nodes | True |
| MA/linux/ASB | 200 load units | 25 nodes | True |
| MB/unix/ASB | 1600 load units | 25 nodes | True |

FIG. 5 illustrates application of an algorithm similar to that shown in FIGS. 3 and 4 to the input of Tables 1 and 2, for different values of performance and availability requirements. Each point in the graph corresponds to the design higher curve, namely curve 11, at approximately 9 minutes. Thus a system having a downtime requirement between 2 and 9 minutes would achieve a best cost using design 15, while a downtime requirement of greater than 9 minutes but less than the next curve would achieve a best cost using design 11, for 2000 units of load.

From FIG. 5, despite the small size of the example design space, the number of optimal solutions distributed across the requirements space is significant and generally tedious to manually evaluate. The more powerful machine MB is never selected by the algorithm. Low cost machines tend to have a lower cost per unit of load, but the situation could change if the application scales sublinearly with the number of nodes. From FIG. 5, downtime increases with estimated load.

Figure 6B:
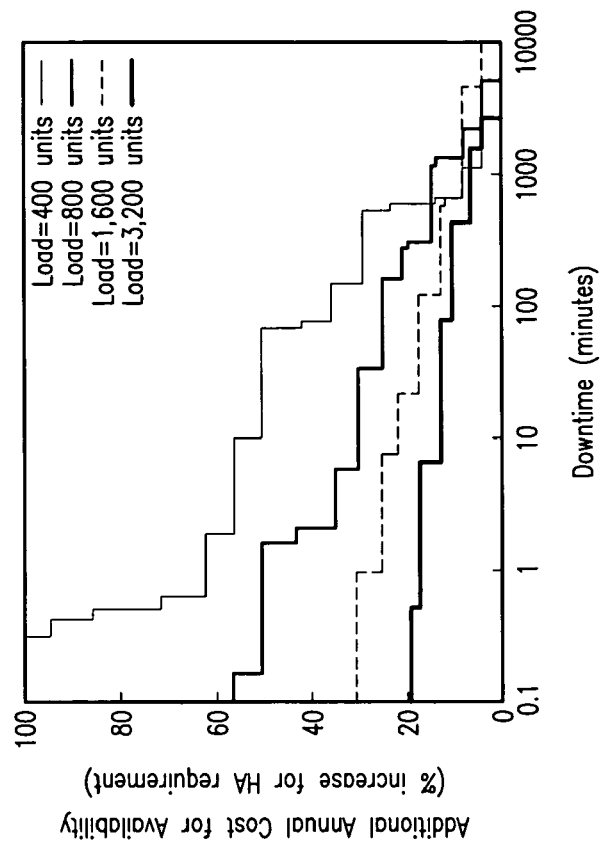
FIG. 6B shows a graph of additional annual cost required for availability on a relative cost (percentage) basis, used to enhance the operation of the present configuration.
Figure 6A:
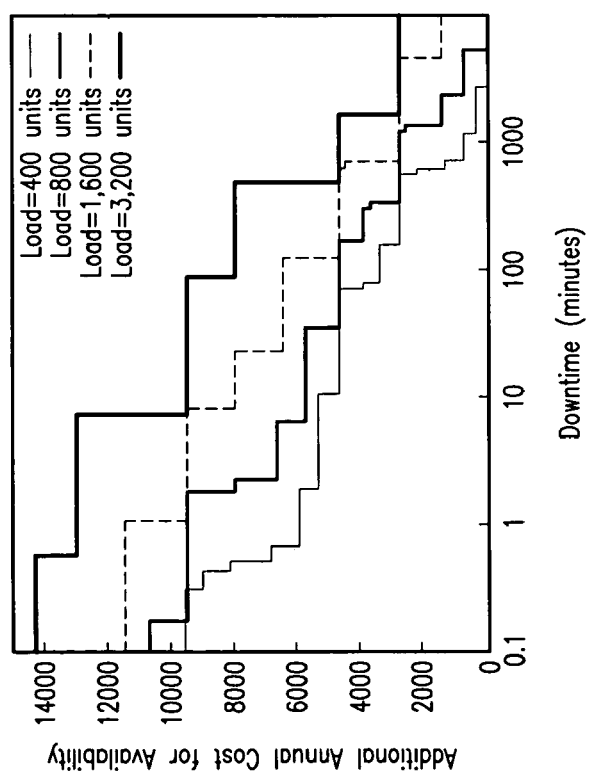
FIG. 6A is a graph of additional annual cost required for availability on an absolute cost basis, used to enhance the operation of the present configuration.

Knowledge of the cost associated with each design can further enhance the selection of designs. FIGS. 6A and 6B illustrate costs associated with an optimal design at various levels of availability and performance requirements. Each curve shows the additional annual availability cost as a function of the required downtime, for a particular load. Additional availability cost is the extra annual cost necessary to provide the required availability when compared to a minimum cost design that can support the same load without an availability requirement. Additional availability cost becomes zero when required downtime increases beyond a certain point. FIG. 6A shows the absolute additional annual availability cost while FIG. 6B illustrates the relative additional cost, as a percentage of the minimum cost design for the same load.

Each step in FIGS. 6A and 6B corresponds to a change in the selected design. The size of each step corresponds to the difference in the costs of the associated designs. FIGS. 6A and 6B therefore graphically illustrate the tradeoff between cost and availability. In some cases, a low additional cost can result in a significant improvement in downtime. Alternately, slightly relaxing the downtime requirement can significantly reduce the additional availability cost. For example, for a service with 800 units of load in FIGS. 6A and 6B, the cost to reduce downtime from 150 minutes to 10 minutes increases slightly from $4,700 to $5,700. Alternatively, increasing required downtime from 1.5 minutes to 2.5 minutes for the same 800 units of load can significantly reduce the cost from $9,500 to $6,600.

A utility function may be employed which estimates the cost of each value of annual downtime, such as the expected loss of revenues when the service is offline. With such a utility function, a user may select the best design to minimize cost, combining the cost for providing availability as shown in FIGS. 6A and 6B with the cost of lost revenue provided by the utility function.

Further Applications of the Technology

The foregoing design may be applied in various contexts. By way of example and not by way of limitation, the foregoing design may be employed in the following scenarios. The baseline case is the situation where the system receives service performance and availability requirements, the system finds a lowest cost design meeting the requirements specified. Alternately, the system may receive a performance requirement and a maximum cost and find the design having a relative best level of availability. Further, the system may receive a fixed performance requirement and a range of availability requirements. The system then determines the set of designs having a relative minimal cost for each availability requirement in the specified range. Another alternate design provides for the system receiving a fixed performance requirement and a range of costs. The system finds a set of designs, each having a highest availability that does not exceed the cost for each value in the specified cost range. Further alternate evaluation processes may be employed to select a final design or set of final designs according to varied criteria.

General operation of the system 100 of FIG. 1A receiving different input criteria remains the same, while certain components, most notably design generator 104, operates to establish a preferred design or set of designs satisfying the desired output format. The design generator 104 receives criteria from Service Requirements UI 101a, Service Specification 101b, Infrastructure Specification 102, and in certain instances the availability evaluation engine 107 and produces a candidate design or intermediate representation based on the criteria received. The design generator 104 may operate iteratively in conjunction with the availability evaluation engine 107 wherein the design generator 104 produces a candidate design satisfying the criteria provided by the Service Requirement UI 101a, Service Specification 101b and the Infrastructure Specification 102. The system and method disclosed typically operates to determine a design before the design is deployed. The system 100 of FIG. 1 and the associated method may be further employed within a control loop in which the present system 100 monitors the infrastructure and service characteristics continuously during service operation and the system changes the design during the service lifetime based on changes to the service or infrastructure.

It will be appreciated to those of skill in the art that the present design may be applied to other systems that employ architecture component design selection functionality, particularly those using automated selection processes. In particular, it will be appreciated that various architecture selection schemes may be addressed by the functionality and associated aspects described herein.

Although there has been hereinabove described a system and method for selecting a preferred design for a multi-tier architecture of components based on an established downtime requirement, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A computer system for selecting a preferred design architecture for a multi-tiered architecture based on a service specification, an infrastructure specification, and service requirements, comprising:
  a design generator configured to receive the service specification and the infrastructure specification and establishing candidate designs based thereon; and
  an availability evaluation engine configured to receive the candidate designs and provide an availability estimate for each of the received designs to the design generator;
  wherein said design generator is configured to operate in conjunction with the availability evaluation engine to, for each of plural tiers of the multi-tiered architecture:
    iteratively evaluate a plurality of candidate designs satisfying a first criterion based on available spare components for the tier and anticipated performance of resource components in the tier;
    select a lowest cost design from the plurality of candidate designs; and
    establish the lowest cost design as a preferred design.

2. The computer system of claim 1, further comprising deployment mechanism receiving the preferred design from the design generator and providing for deployment of the design.

3. The computer system of claim 2, further comprising optional translators for translating the preferred design provided by the design generator into a format operable upon by the deployment mechanism.

4. The computer system of claim 1, further comprising optional translators for translating each candidate design provided by the design generator into a format operable upon by the availability evaluation engine.

5. The computer system of claim 1, wherein the service specification is provided by a customer through a user interface and comprises:
  listing the plural tiers;
  listing candidate resource types usable in each tier;

listing a service tier performance characterization for each candidate resource type; and providing an indication as to whether each tier is deployable in a clustered configuration.

6. The computer system of claim 1, wherein the infrastructure specification is stored in a repository and provides a description of design choices usable to generate candidate designs, said infrastructure specification comprising providing a resource specification, said resource specification comprising at least one component specification, wherein the component specification comprises component cost and component availability properties derived from properties of components that are part of the resource.

7. The computer system of claim 1, wherein the service specification is available from a repository and comprises:

listing the plural tiers;

listing candidate resource types usable in each tier;

listing a service tier performance characterization for each candidate resource type; and providing an indication as to whether each tier is deployable in a clustered configuration.

8. The computer system of claim 1, wherein the evaluated plurality of candidate designs include candidate designs having different numbers of spare components, where the spare components are used to provide redundancy in case of failure of one or more of the resource components.

9. A method for selecting a preferred design for a multi-tier architecture of components based on an established downtime requirement, the method comprising:

establishing a minimum cost design;

evaluating downtime for the minimum cost design, and if the downtime for the minimum cost design satisfies the specified downtime requirement, establishing the minimum cost design as the preferred design;

for each resource type alternative for each tier:

assessing whether a minimum cost design for each resource type has higher cost than the current preferred design, and whether a minimum downtime design for each resource type has higher downtime than the specified downtime requirement, and skipping evaluation of any further design for this resource type if either condition is true;

determining a fewest number of spare components such that at least one candidate design with the fewest number of spare components meets the specified downtime requirement;

evaluating cost of each candidate design having at least the fewest number of spare components previously determined and at most a specified maximum number of spares;

identifying evaluated designs having cost lower than the current preferred design;

iteratively estimating downtime of each evaluated design and when one such evaluated design satisfying the specified downtime requirement, replacing the current preferred design with the one such evaluated design; and establishing the current preferred design as the preferred design.

10. The method of claim 9, wherein establishing a minimum downtime design comprises selecting the design with a maximum number of spare resources and fastest component repair options.

11. The method of claim 9, wherein the minimum downtime design and the design comprises:

a resource type for the tier;

a number of resources in the tier;

a state of each resource, wherein said state comprises one from a group comprising active and inactive; and a repair option for each failure mode of each component type of each selected resource type.

12. The method of claim 9, wherein identifying evaluated designs having cost lower than the current preferred design comprises:

establishing a set of cost criteria for all resources in each design, said cost criteria comprising at least one from a group comprising:

currency required to obtain the components of said resource;

currency required to maintain the components of said resource; and currency required to obtain a license to operate the component of said resource; and selecting that design minimizing the cost criteria in view of the required downtime.

* * * * *